Patented Apr. 11, 1933

1,903,636

UNITED STATES PATENT OFFICE

CHRISTOPHER CAIGER SMITH, OF NORTON-ON-TEES, ENGLAND, ASSIGNOR TO IMPERIAL CHEMICAL INDUSTRIES LIMITED, OF LONDON, ENGLAND, A BRITISH COMPANY

PRODUCTION OF SOLID CALCIUM NITRATE

No Drawing. Application filed January 15, 1930, Serial No. 421,075, and in Great Britain January 25, 1929.

This invention relates to an improved method of preparing solid calcium nitrate. Existing methods of preparing this salt by evaporation of concentrated aqueous solutions have been difficult to carry out and unsatisfactory with regard to the product obtained. Strong solutions of calcium nitrate tend to become syrupy and difficult to handle and the hydrated crystals normally obtained from them readily liquefy on absorbing small quantities of water.

The solubility of calcium nitrate in nitric acid increases with the dilution of the acid, but decreases with rise of temperature. The present invention utilizes this phenomenon, which depends upon the selection of a temperature at which solid calcium nitrate is in equilibrium with a sufficiently dilute nitric acid solution as to be commercially available. Thus for example temperatures of 45–60° C. are suitable with 50% nitric acid.

According to my invention I separate solid and preferably anhydrous calcium nitrate from a solution saturated with respect thereto and also containing a substantial quantity of nitric acid. Thus I may precipitate strong solutions of calcium nitrate by addition of, or mixing with nitric acid but I prefer to proceed by forming the calcium nitrate in a nucleus solution containing both calcium nitrate and nitric acid.

According to a preferred form of the invention a solution of nitric acid of suitable strength is saturated with calcium nitrate or nitric acid is added to a solution of calcium nitrate and the temperature is adjusted to a temperature at which solid anhydrous calcium nitrate is in equilibrium with the acid solution. A calcium salt is preferably then added together with an equivalent amount of nitric acid, whereupon anhydrous calcium nitrate is precipitated.

In a preferred form of the invention in which the reaction is carried out in a continuous manner, chalk is added continuously to a 50% solution of nitric acid saturated with calcium nitrate. Simultaneously at a suitable temperature from 45 to 60° C. oxides of nitrogen, or gases containing oxides of nitrogen, are continuously led into the solution so that the concentration of nitric acid remains constant and anhydrous calcium nitrate is continuously precipitated. Unabsorbed nitrogen oxides may be recirculated through the system.

The crystals of calcium nitrate are removed by centrifuging or in any other desired manner and washed with a suspension of chalk in calcium nitrate solution of such strength that the adherent acid is just neutralized.

Anhydrous calcium nitrate is thus obtained without the necessity of evaporation.

I have found that the above described process for the preparation of calcium nitrate may very advantageously be employed in direct conjunction with the oxidation of ammonia with or without pressure. For this purpose part of the gas issuing from the oxidation plant and containing oxides of nitrogen may be absorbed in the usual manner to produce nitric acid whilst the remainder is diverted through a solution of about 50% nitric acid saturated with calcium nitrate at a suitable temperature. Chalk is added continuously to the solution at a rate corresponding to the absorption of oxides of nitrogen, whereupon anhydrous calcium nitrate is precipitated. The unabsorbed gas then rejoins the stream of gas passing direct to the nitric acid system.

Anhydrous calcium nitrate is thus obtained together with a solution of nitric acid which is somewhat weaker than that normally produced, but since the weak acid may be used for the production of salts, e. g. sodium, potassium and ammonium nitrate, solutions of which are easy to evaporate, this is not a serious disadvantage.

I declare that what I claim is:—

1. Process for the production of solid calcium nitrate which consists in forming said calcium nitrate in a solution saturated with respect to calcium nitrate and containing about 50% nitric acid.

2. Process for the production of solid calcium nitrate which consists in forming said calcium nitrate in a solution saturated with respect to calcium nitrate and containing about 50% nitric acid and adjusting the temperature to about 45-60° C.

3. Process for the production of solid calcium nitrate which consists in adding nitric acid and a decomposable calcium salt to a solution of calcium nitrate in about 50% nitric acid.

4. Process for the production of solid calcium nitrate which consists in mixing a strong solution of calcium nitrate with nitric acid and washing the calcium nitrate which is precipitated with a suspension of chalk in calcium nitrate solution.

5. Process for the production of solid calcium nitrate which consists in forming said calcium nitrate in a solution saturated with respect to calcium nitrate and containing nitric acid and washing the calcium nitrate which is precipitated with a suspension of chalk in calcium nitrate solution.

6. Process for the production of solid calcium nitrate and nitric acid which consists in oxidizing ammonia, absorbing part of the oxidation products to form nitric acid, leading the remainder through a nitric acid solution of calcium nitrate, and leading the unabsorbed nitrogen oxides back to the nitric acid plant.

7. Process for the production of solid calcium nitrate which consists in adding chalk to, and simultaneously passing nitrogen oxides into, a solution of calcium nitrate in about 50% nitric acid at a temperature of 45-60° C.

CHRISTOPHER CAIGER SMITH.